United States Patent [19]

Porel

[11] Patent Number: 5,395,125
[45] Date of Patent: Mar. 7, 1995

[54] ROTATING JOINT FOR HYDRAULIC SYSTEM

[75] Inventor: Louis-Claude Porel, Rambervillers, France

[73] Assignee: Hydro Rene Leduc, Azerailles, France

[21] Appl. No.: 27,141

[22] Filed: Mar. 5, 1993

[30] Foreign Application Priority Data

Mar. 6, 1992 [FR] France ................... 92 02691

[51] Int. Cl.6 ............................................. F16J 15/16
[52] U.S. Cl. ...................................... 277/136; 277/165
[58] Field of Search ................. 277/27, 136, 165, 168, 277/176, 177, DIG. 8, 207 R, 215

[56] References Cited

U.S. PATENT DOCUMENTS

| | | | |
|---|---|---|---|
| 2,915,349 | 12/1959 | Gomberg | 277/165 |
| 3,007,724 | 11/1961 | Amirault et al. | 277/136 |
| 3,149,848 | 9/1964 | Galloway | 277/165 |
| 3,285,614 | 11/1966 | McClenathan | 277/136 |
| 3,814,445 | 6/1974 | Bitzan | 277/165 |
| 3,990,712 | 11/1976 | Dechavanne | 277/165 |
| 4,418,924 | 12/1983 | Mack | 277/177 |
| 4,592,559 | 6/1986 | Harvey | 277/176 X |
| 4,714,259 | 12/1987 | Mack et al. | 277/165 |
| 4,749,202 | 6/1988 | Bonomi | 277/165 |
| 4,856,794 | 8/1989 | Boyers et al. | 277/136 X |
| 5,018,753 | 5/1991 | Porel | 277/165 |
| 5,172,921 | 12/1992 | Stenlund | 277/165 X |

FOREIGN PATENT DOCUMENTS

| | | |
|---|---|---|
| 0242741 | 10/1987 | European Pat. Off. . |
| 0348267 | 12/1989 | European Pat. Off. . |
| 1049256 | 12/1953 | France . |
| 2129373 | 10/1972 | France . |
| 2138311 | 1/1973 | France . |
| 2224027 | 10/1974 | France . |
| 2551832 | 3/1985 | France . |
| 2538871 | 7/1994 | France . |
| 0040309 | 3/1990 | Japan ................... 277/165 |
| 1138630 | 1/1969 | United Kingdom . |

Primary Examiner—William A. Cuchlinski, Jr.
Assistant Examiner—John L. Beres
Attorney, Agent, or Firm—Darby & Darby

[57] ABSTRACT

A composite joint for a hydraulic system having two parts which rotate relative to each other is formed by the combination of a friction ring of hard material which is mechanically anchored to one of the relative rotating parts as a supporting collar around a ring of more flexible material mounted in a groove of the one part to exert a force on the ring of hard material providing with the joint a relatively large clearance between the two relatively rotating parts.

8 Claims, 1 Drawing Sheet

ROTATING JOINT FOR HYDRAULIC SYSTEM

BACKGROUND OF THE INVENTION

The present invention relates to a rotating joint for hydraulic systems, in which the tightness is ensured by composite joints.

These composite joints are advantageously used in hydraulic systems at pressures higher than 400 bars, notably to obtain tightness between two cylindrical parts rotating relative to each other.

DESCRIPTION OF THE PRIOR ART

In French Patent No. 1,049,256 of Jan. 18, 1951, in the name of Mr. Rene LEDUC, a composite joint is described of an assembly of a ring of hard material, having good friction qualities, and a ring of elastic material, the latter becoming deformed under the action of the hydraulic pressure and applying the ring of hard material against the surface on which it rubs.

In patent 2,138,311 of May 24, 1971, in the name of the company Rene LEDUC et Fils, an improvement has been described intended to prevent any sliding of one of the rings relative to the other. This improvement includes arranging in the face of the ring of hard material, which is in contact with the ring of elastic material, a plurality of small cells, so that under the action of the hydraulic pressure the elastic material flows into the cells, thereby anchoring the elastic material in the hard material.

In the certificate of addition No. 2,538,871, two improvements were described: a first according to which the friction ring of hard material is provided on both sides with peripheral grooves; and a second according to which the ring of hard material is pierced by orifices traversing it from end to end; so that the end of each orifice in contact with the metallic part retains hydraulic liquid, its other end serving as an anchoring cell for the soft and ductile material.

In document EP 0,348,267 A1 in the name of Societe Anonym HYDRO RENE LEDUC, a composite joint is described having a friction ring of hard material and a ring of more flexible material, in which the anchoring cells in the ring of hard material have non-opening grooves parallel to the axis of rotation of the parts and in which the ring of more flexible material has integrally molded ribs having practically the same width and height as the grooves but a smaller length. The ribs are set in the grooves to fix the two rotating rings.

However, the realization of the composite joint described in that document requires the machining of a deep groove to seat the two rings and a high-quality adjustment between the rotating parts relative to each other.

SUMMARY OF THE INVENTION

The subject of the present invention is a rotating joint for hydraulic systems which has an assembly comprising two parts rotating relative to each other and at least one composite joint of the type formed of the combination of a friction ring of hard material and a ring of flexible material. The ring of flexible material is retained in an annular groove of a first one of said parts in relative rotation being able to exert on the ring of hard material a radial stress to ensure tightness between said parts. In a preferred embodiment the ring of hard material is shaped as a supporting collar so as to permit mounting the parts in relative rotation with a relatively large clearance and in that the ring is made integral with said first part by anchoring means.

BRIEF DESCRIPTION OF THE INVENTION

According to the characteristics of the invention:

The ring of hard material protrudes at least partially on one side of the seating groove of the ring of more flexible material, said side corresponding to a contact region of the ring of hard material with the part that it is integral with;

the ring of hard material presents, at least locally on said contact region, conformations cooperating with machinings of matching form in a seating groove of the ring of hard material, to constitute said anchoring means;

the anchoring means have ribs ("picots") made on the part, cooperating with depressions of matching form on the ring of hard material, or vice versa;

the part integral with the ring of hard material has a seating groove for the ring of hard material, inside of which the seating groove for the ring of more flexible material is machined;

the anchoring means have at least one punctiform fastening means cooperating with a seating of the part for making the ring of hard material integral with the part;

the ring of hard material protrudes substantially on either side of the seating groove of the ring of more flexible material.

BRIEF DESCRIPTION OF THE DRAWINGS

The invention will be understood better with the aid of the description given by way of non-limiting example with reference to the annexed drawings in which.

DESCRIPTION OF THE PREFERRED EMBODIMENTS

Figure 1:
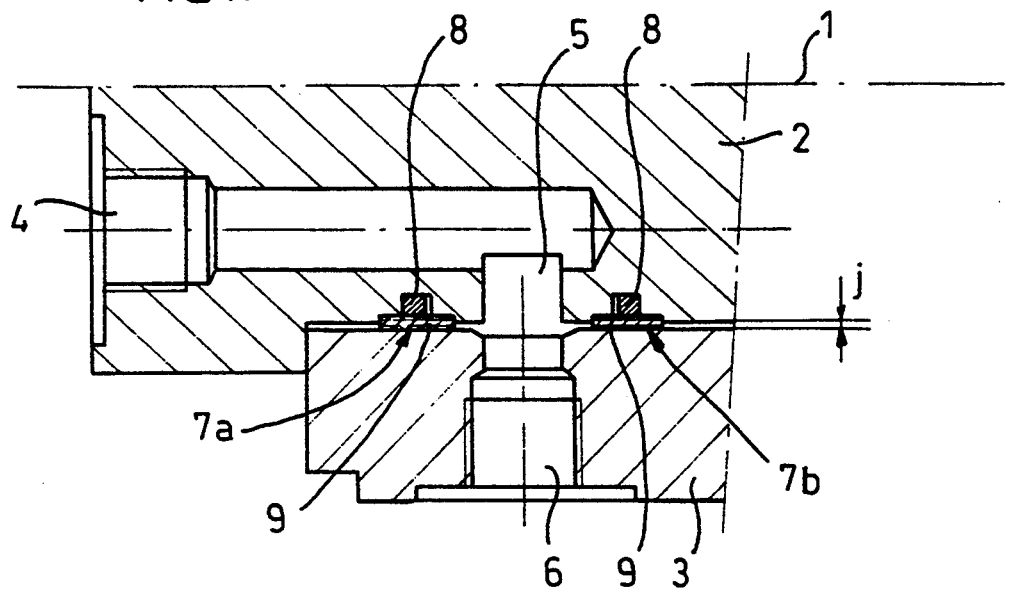
FIG. 1 represents a schematic view in radial half-section of a rotating joint according to the invention.

In reference to FIG. 1, an assembly called "hydraulic rotating joint" able to rotate about an axis of revolution 1 comprises a rotor 2 and a stator 3 separated by a relatively large clearance j.

The rotor 2 has a drilling 4 for the circulation of a hydraulic fluid under pressure, into which opens an annular groove 5.

The stator 3 has a drilling 6 opening radially inward, so that the hydraulic fluid under pressure circulates freely between drilling 4 and drilling 6 across the annular groove 5.

On either side of the annular groove 5, two machinings 7a, 7b are for example substantially symmetrical relative to the median diametrical plane of the annular groove 5. The tightness of the rotating joint is obtained by means of combining rings 8 of relatively flexible material (such as rubber) and rings 9 of hard material of good friction qualities (such as nylon or TEFLON). These combinations called "composite joints" are placed in the machinings 7a, 7b.

The rings 8 of relatively flexible material are in the example described radially inward of the rings 9 of hard material, in order that the relatively flexible material compressed by the hydraulic fluid under high pressure will in turn exert a radial stress on the hard material of ring 9 to apply it against the wall of the stator 3 and thus ensure tightness between the rotor 2 and stator 3.

Figure 2:
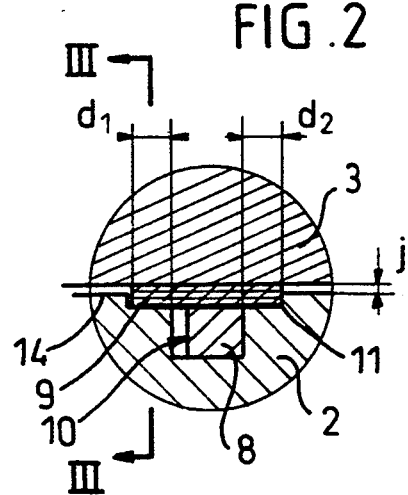
FIG. 2 represents a schematic view in section on a large scale of a rotating joint according to the invention.

In reference to FIG. 2, according to the invention, the ring 9 of hard material protrudes substantially on either side of an annular groove 10 for seating the ring 8 of relatively flexible material, while yet being made integral with the rotating rotor 2 by anchoring means.

Thus, ring 8 of relatively flexible material retained in the seating groove 10 is capped by ring 9 of hard material integral with the rotating rotor 2. Ring 8 thus undergoes no relative sliding or any friction susceptible of heating it during rotation of rotor 2; the anchoring characteristics of ring 9 relative to ring 8 are thus preserved.

Advantageously there is provided an annular groove 11 of a width slightly greater than the width of ring 9, to seat ring 9 so as to avoid any notable longitudinal flapping during the rotation of rotor 2 relative to stator 1.

The annular groove 11 is preferably machined before the machining of the annular groove 10 inside groove 11.

The respective positions of the grooves 10 and 11 are such that ring 9 protrudes relative to groove 10, on one side by a predetermined distance d1, and on the opposite side by another predetermined distance d2. Preferably the distances d1 and d2 are substantially equal.

According to the invention, ring 9, substantially wider than ring 8, fulfills the function of a supporting collar integral with the rotor, so as to separate the stator from the rotor by a large clearance j thus avoiding any friction between stator and rotor.

The introduction of a large clearance j between the parts rotating relative to each other offers several advantages:

the elimination of direct friction of the rotor on the stator permits making the rotor and stator of ordinary steel or similar material of improved machinability, which substantially reduces the cost of the rotor and of the stator;

the elimination of friction also permits eliminating the surface treatments normally necessary, which provides an additional saving;

lastly, the machining of the annular grooves 10 and 11 on the radially inward part 2 can be done economically on the lathe.

Figure 3A:
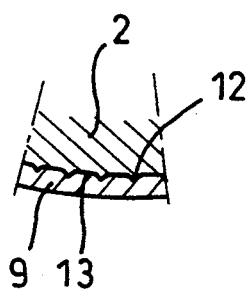
FIGS. 3A and 3B represent schematic views in section corresponding to line III—III of FIG. 2.
Figure 3B:
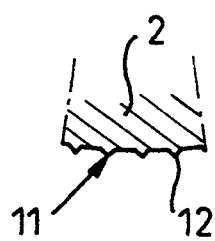

Referring to FIGS. 3A and 3B, the groove 11 of rotor 2 is machined at least locally on the region corresponding to a predetermined distance d1 or d2 to offer anchoring means 12 cooperating with conformations 13 of a form matching ring 9 of hard material.

The anchoring means 12 are preferably ribs remaining in relief after machining of groove 11, and the conformations 13 are for example depressions able to receive the ribs 12 and directly molded onto the radially inward face of ring 9.

According to the invention, any other suitable and mechanically equivalent means of firm connection can also be used, such as notably: cells L2 cooperating with protuberances 13 or ribs 12 cooperating with grooves 13.

It is imperative however — as specified in document EP 0,348,267 A1 in the name of Societe Anonyme HYDRO RENE LEDUC, the content of which is considered as integrally forming part of the present description — to prevent any leakage or penetration of hydraulic liquid between the rings 9 and 10, that is susceptible to disengage them from one another.

The hydraulic fluid under high pressure passes between ring 9 of hard material and the wall of rotor 2 and pressurizes the inner volume of groove 10.

Ring 8 of flexible material is thus compressed in the interior of groove 10 and in turn exerts a radial stress on ring 9 of hard material to ensure the tightness between parts 2 and 3.

Figure 4:
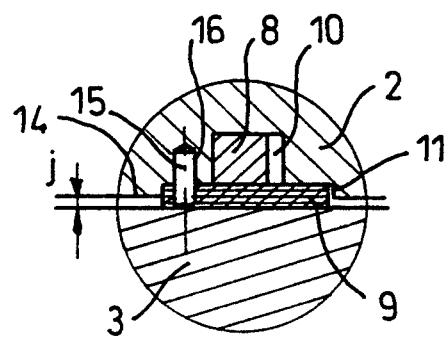
FIG. 4 represents a view analogous to FIG. 2 of another rotating joint according to the invention.

Referring to FIG. 4, where identical reference symbols designate elements identical or similar to those in the other figures, ring 9 of hard material is anchored in rotor 2 by at least one punctiform fastening means 15 cooperating with a seating 16 machined in rotor 2 to make ring 9 of hard material integral with part 2.

The punctiform fastening means 15 are for example rivets, pins or screws with widened, non-projecting head cooperating with matching bores or taps 16 in rotor 2.

The invention also encompasses, of course, any modification of form or variant of realization of machinings 7a, 7b on a radially inward part 2, different from the combinations of grooves 10 and 11, but functionally equivalent.

The movement of relative rotation permits also, without going outside the scope of the invention, to interchange the roles of the rotor 2 and stator 3. Consequently the invention covers also the variant according to which the immobile radially inward part 2 is the stator, and the radially outward part 3 constitutes the rotor.

What is claimed is:

1. Rotating joint for hydraulic systems comprising:
    an assembly of two parts rotating relative to each other;
    a composite joint of a friction ring of hard material and a ring of flexible materials, the ring of flexible material retained in an annular groove of a first one of said relatively rotating parts and the ring of hard material being mounted therearound as a collar, the ring of flexible material exerting a radial stress on the ring of hard material to ensure the tightness between said parts to mount the parts in relative rotation with a relatively large clearance; and
    means to anchor the ring of hard material to said first relatively rotating part to make it integral with said first relatively rotating part.

2. Rotating joint according to claim 1, wherein the first part is formed with a seating groove which overlies and extends on each side of said annular groove to seat the ring of hard material to protrude at least partially on one side of the annular groove of the ring of flexible material, said protruding side corresponding to a contact region of the ring of hard material with said one part that it is integral with.

3. Rotating joint according to claim 2, wherein said anchoring means includes on the ring of hard material in its contact region with the seating groove conformations cooperating with machinings of matching form in the seating groove.

4. Rotating joint according to claim 1, wherein the anchoring means comprises ribs on one of said one relatively rotating assembly parts and said ring of hard material part cooperating with depressions of matching form on the other of said relatively rotating assembly parts and said ring of hard material.

5. Rotating joint according to claim 1, wherein the relative rotating part with which the ring of hard material is integral has a seating groove for the ring of hard material in the interior of which is machined the annular groove for the ring of more flexible material.

6. Rotating joint according to claim 1, wherein the anchoring means comprises at least one punctiform fastening means cooperating with a seating of the assembly part on which it is mounted for making the ring of hard material integral with the part.

7. Rotating joint according to claim 1, wherein the ring of hard material protrudes substantially on each side of the annular groove in which the ring of more flexible material is seated.

8. Rotating joint as in claim 1 wherein the assembly of two parts includes a rotor and a stator, said rings being mounted on said rotor.

* * * * *